Jan. 18, 1927.
M. OSTERBERG ET AL
1,614,895
ONE-WAY CLUTCH
Filed March 3, 1926
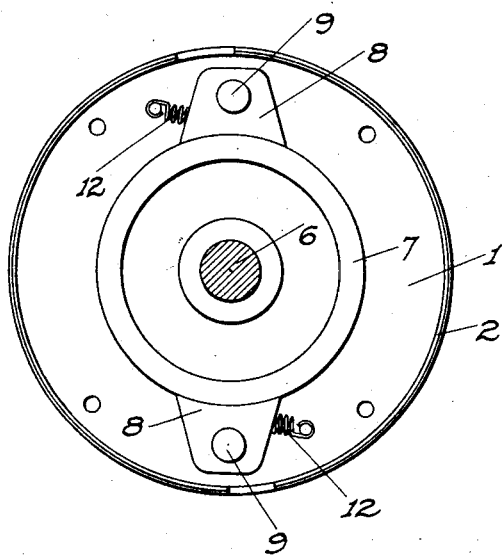
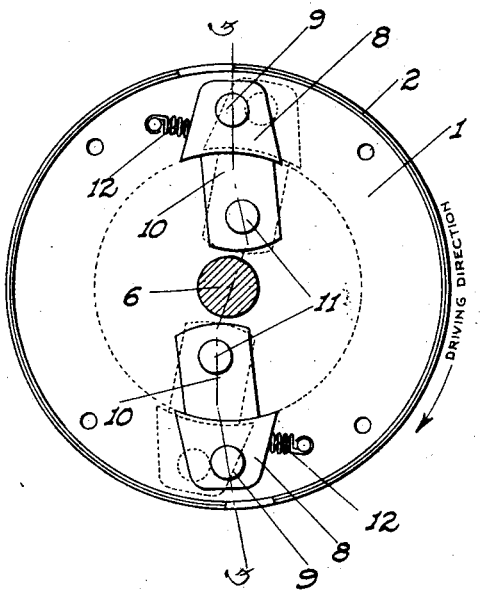
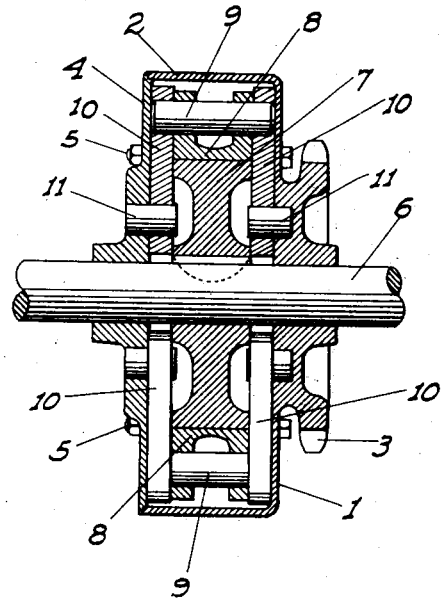
INVENTORS
M. Osterberg
Wm. Osterberg
BY
ATTORNEY Patented Jan. 18, 1927.

1,614,895

UNITED STATES PATENT OFFICE.

MAURITS OSTERBERG AND WILLIAM OSTERBERG, OF MODESTO, CALIFORNIA.

ONE-WAY CLUTCH.

Application filed March 3, 1926. Serial No. 91,924.

This invention relates to improvements in one-way or overrunning clutches; our principal object being to provide a device of this character so constructed that there will be no lost motion between the members of the clutch when the driving member engages the driven member in driving relation therewith, after said members have been moving at different speeds.

The usual ratchet or similar connection between the clutch members has been eliminated, and its place taken by friction shoes of large area so connected to one clutch member that no slippage is possible between the shoes and clutch member which they engage.

This construction, as will be evident from a perusal of the following specification, in connection with the accompanying drawings, eliminates any sudden jars and shocks to the mechanism when the driving member takes hold of the driven member, and provides a very strong and simple device without the use of large and heavy parts to avoid the danger of any further breaking in service.

We have in mind to use this clutch particularly in connection with well drilling, to control the vertical movement of the drill rods. In this operation it is desired that the rod shall be raised by power and allowed to drop freely and quickly of its own weight; and our particular form of clutch lends itself admirably for this purpose.

The clutch however can also of course be used in connection with any mechanism in which a clutch of this general character is useful or necessary.

These objects we accomplish by means of such structure and relative arrangement of parts as will fully appear by a perusal of the following specification and claim.

In the drawings similar characters of reference indicate corresponding parts in the several views:

Fig. 1 is a front elevation of the clutch, with the outer cover plate and shoe links removed.

Fig. 2 is a similar view with the driven member of the clutch also removed.

Fig. 3 is a longitudinal section of the structure, taken on the line 3—3 of Fig. 2.

Referring now more particularly to the drawings, the characters of reference on the drawings, the numeral 1 denotes a disc preferably having an annular flange 2 all around its outer periphery and arranged to be driven in any suitable manner, as for instance by means of a sprocket wheel 3 attached thereto or formed as a part thereof, and located on the outside. An outer cover plate 4 abuts against the outer edge of the flange 2 and is removably connected to the disc 1 by bolts 5, thus forming an enclosure between the disc, plate and flange. This unit constitutes the driving member of the clutch.

Turnably mounted in the disc and plate centrally thereof and projecting therethrough is a shaft 6. Fixed on this shaft between the plate and disc is a wheel 7 whose outer periphery is smooth throughout and concentric with the shaft.

Engaging the periphery of the wheel are opposed shoes 8. There may be any number of these shoes, depending on the size of the device and the preference of the designer, though two shoes as here shown are usually ample.

These shoes are turnably mounted on pins 9 disposed parallel to the shaft 6, which pins are mounted in and extend between links 10. These links are disposed between the opposite faces of the wheel and the plate and disc of the drive member, and project toward the shaft 6, being pivoted to said plate and disc by pins 11 disposed parallel to the shaft 6.

The distance from the shaft to the pins 9 is such that if the link pins are diametrally alined with each other and with the shaft, the distance between the adjacent shoe faces will be greater than the diameter of the wheel 7 as indicated in dotted lines in Fig. 2.

Springs 12 however are applied to the shoes and pull said shoes and their links out of such diametral alinement so that the distance between the shaft 6 and pins 9 is lessened and the shoes bear against the wheel as shown in Fig. 1. The links therefore are normally disposed at an angle to a diametral line through the shaft and the inner link pins 11, and if the driving member 1 is driven in a direction such as to tend to increase the angularity of the links relative to said diametral line, the shoes will be tightly and frictionally engaged with the wheel. The driving and driven members will then be locked together and will rotate at the same speed. If, however, the inner driven member 7 rotates at a faster speed than the driving member, and overruns the latter, the shoes are acted on to move them and their links in the opposite direction or so as to move the links toward a radial position. This automatically causes the distance between the shoes to be increased, as previously pointed out, and the frictional engagement between the shoes and wheel will be broken, allowing the latter to turn freely.

When the speed of the driving member becomes relatively greater than that of the driven member, the conditions are immediately reversed and the shoes again grab the wheel 7, the springs 12 continually acting to cause the initial grab action to take place.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

A one-way clutch comprising a driving member, a cylindrical driven member turnably mounted therein, side members provided with the driving member and enclosing the driven member in spaced relation thereto, shoes engaging the periphery of the driven member, links depending inwardly from the shoes between the driven member and the sides of the driving member, said links being pivoted at their outer ends onto the shoes, and a pivot pin at the inner end of each link mounted in the adjacent side member.

In testimony whereof we affix our signatures.

MAURITS OSTERBERG.
WILLIAM OSTERBERG.